United States Patent
Chang et al.

(10) Patent No.: US 12,401,280 B2
(45) Date of Patent: Aug. 26, 2025

(54) MULTI-PHASE VOLTAGE CONVERTER WITH INDIVIDUAL PHASE TEMPERATURE REPORTING

(71) Applicant: Monolithic Power Systems, Inc., Kirkland, WA (US)

(72) Inventors: Chiahsin Chang, Sammamish, WA (US); Chao Liu, Sunnyvale, CA (US); James Nguyen, Bellevue, WA (US)

(73) Assignee: Monolithic Power Systems, Inc., Kirkland, WA (US)

( * ) Notice: Subject to any disclaimer, the term of this patent is extended or adjusted under 35 U.S.C. 154(b) by 274 days.

(21) Appl. No.: 17/839,573

(22) Filed: Jun. 14, 2022

(65) Prior Publication Data
US 2023/0402925 A1 Dec. 14, 2023

(51) Int. Cl.
*H02M 3/158* (2006.01)
*H02M 1/00* (2007.01)
*H02M 1/32* (2007.01)

(52) U.S. Cl.
CPC ....... *H02M 3/1584* (2013.01); *H02M 1/0043* (2021.05); *H02M 1/32* (2013.01); *H02M 1/327* (2021.05)

(58) Field of Classification Search
CPC .... H02M 3/1584; H02M 3/1586; H02M 1/32; H02M 1/327; H02M 1/0043
See application file for complete search history.

(56) References Cited

U.S. PATENT DOCUMENTS

| | | | |
|---|---|---|---|
| 8,360,636 B2 * | 1/2013 | Sato | H05K 1/0201 374/170 |
| 8,742,622 B2 * | 6/2014 | Richards, III | H02M 1/32 363/148 |
| 9,184,651 B2 | 11/2015 | Nguyen | |
| 9,263,937 B2 | 2/2016 | Nguyen | |
| 9,780,640 B2 | 10/2017 | Nguyen | |
| 9,812,963 B1 | 11/2017 | Nguyen | |
| 10,224,816 B2 * | 3/2019 | Mirjafari | H02M 1/32 |
| 10,270,343 B2 | 4/2019 | Nguyen et al. | |
| 10,594,219 B2 * | 3/2020 | Mirjafari | H02M 1/32 |
| 10,840,795 B1 | 11/2020 | Nguyen | |
| 11,228,248 B1 * | 1/2022 | Zafarana | H03K 5/08 |
| 11,563,369 B2 * | 1/2023 | Zafarana | H02M 3/1584 |
| 2006/0149396 A1 * | 7/2006 | Templeton | H02J 13/00002 700/22 |
| 2011/0002358 A1 * | 1/2011 | Sato | H01L 23/34 374/163 |
| 2011/0025292 A1 * | 2/2011 | Huang | H02J 1/102 323/318 |

(Continued)

OTHER PUBLICATIONS

U.S. Appl. No. 17/398,247, filed Aug. 10, 2021, James Nguyen.

*Primary Examiner* — Thienvu V Tran
*Assistant Examiner* — Yahveh Comas Torres
(74) *Attorney, Agent, or Firm* — Perkins Coie LLP (57) ABSTRACT

A multi-phase voltage converter has a plurality of integrated circuits (ICs), and a controller. Each IC has a temperature report pin and a temperature sensing circuit, the controller has a temperature input pin connected to the temperature report pin of each of the plurality of ICs. The controller provides an acquiring command via the temperature input pin to all of the ICs. The acquiring command is capable of selecting one of the plurality of ICs to report an individual temperature.

16 Claims, 11 Drawing Sheets

(56) References Cited

U.S. PATENT DOCUMENTS

| | | |
|---|---|---|
| 2011/0099395 A1* | 4/2011 | Richards, III ............ G06F 1/28 |
| | | 713/310 |
| 2011/0115447 A1* | 5/2011 | Lin ..................... H02M 3/1584 |
| | | 323/234 |
| 2015/0061630 A1 | 3/2015 | Xu et al. |
| 2015/0370295 A1* | 12/2015 | Luo .................... H02M 3/1584 |
| | | 713/330 |
| 2017/0115725 A1* | 4/2017 | Luo ....................... G06F 1/3296 |
| 2018/0269786 A1* | 9/2018 | Mirjafari ............. H02M 3/1584 |
| 2018/0294720 A1* | 10/2018 | Zhu ........................ G01K 13/00 |
| 2021/0336528 A1* | 10/2021 | Zafarana ............ H02M 3/1584 |
| 2022/0103064 A1* | 3/2022 | Sun ........................ G01K 1/026 |
| 2023/0216411 A1* | 7/2023 | Grisamore ............ G06F 1/3296 |
| | | 323/272 |
| 2023/0216791 A1* | 7/2023 | Grisamore .......... G06F 13/4282 |
| | | 370/389 |

\* cited by examiner

MULTI-PHASE VOLTAGE CONVERTER WITH INDIVIDUAL PHASE TEMPERATURE REPORTING

TECHNICAL FIELD

The present invention generally refers to electrical circuits, and more particularly but not exclusively refers to multi-phase voltage converter with individual phase temperature reporting.

BACKGROUND

In power conversion applications, an interleaved multi-phase voltage converter is widely used in large power and large current condition since the interleaved multi-phase voltage converter may be able to provide a large output current with small current ripples, optimized thermal and power distributions.

Traditionally, the interleaved multi-phase voltage converter has a plurality of phases coupled in parallel and a controller. Each phase may provide a temperature information, the controller has a temperature input pin coupled to each phase to receive the temperature information, and the controller monitors a highest temperature among the plurality of phases of the interleaved multi-phase voltage converter. However, an individual temperature of each phase cannot be obtained.

SUMMARY

Embodiments of the present invention are directed to a multi-phase voltage converter. The multi-phase voltage converter comprises a plurality of integrated circuits (ICs) and a controller. Each IC provides a phase of the multi-phase voltage converter. Each IC comprises a temperature report pin, and a temperature sensing circuit that is configured to sense an individual temperature of an IC containing the temperature sensing circuit. The temperature report pin is configured to receive an acquiring command and report the individual temperature. The controller comprises a temperature input pin coupled to the temperature report pin of each IC. The controller is configured to provide the acquiring command via the temperature input pin to all of ICs. The acquiring command is capable of selecting one of the ICs to report the individual temperature.

Embodiments of the present invention are further directed to an integrated circuit (IC) providing a phase of a multi-phase voltage converter. The IC comprises a power supply pin, a power switch, and a temperature report pin. The power supply pin is configured to receive an input voltage. The power switch is configured to be turned ON and OFF to convert the input voltage to an output voltage. The temperature report pin is coupled to a plurality of ICs that are connected together. The temperature report pin is capable of receiving an acquiring command and reporting an individual temperature of the IC. The IC has a sequencing code, and the temperature report pin is configured to report and stop reporting the individual temperature in response to the acquiring command and the sequencing code.

Embodiments of the present invention are further directed to a controller for a multi-phase voltage converter. The controller comprises a temperature input pin and a plurality of switching control pins. The temperature input pin is coupled to a plurality of integrated circuits (IC) to provide an acquiring command and receive a temperature monitoring signal, each of the plurality of ICs provides a phase of the multi-phase voltage converter. The plurality of switching control pins are configured to provide a plurality of switching control signals to control the plurality of ICs respectively. The acquiring command is capable of selecting one of the plurality of ICs to provide the temperature monitoring signal representative of an individual temperature of the one of the plurality of ICs.

These and other features of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
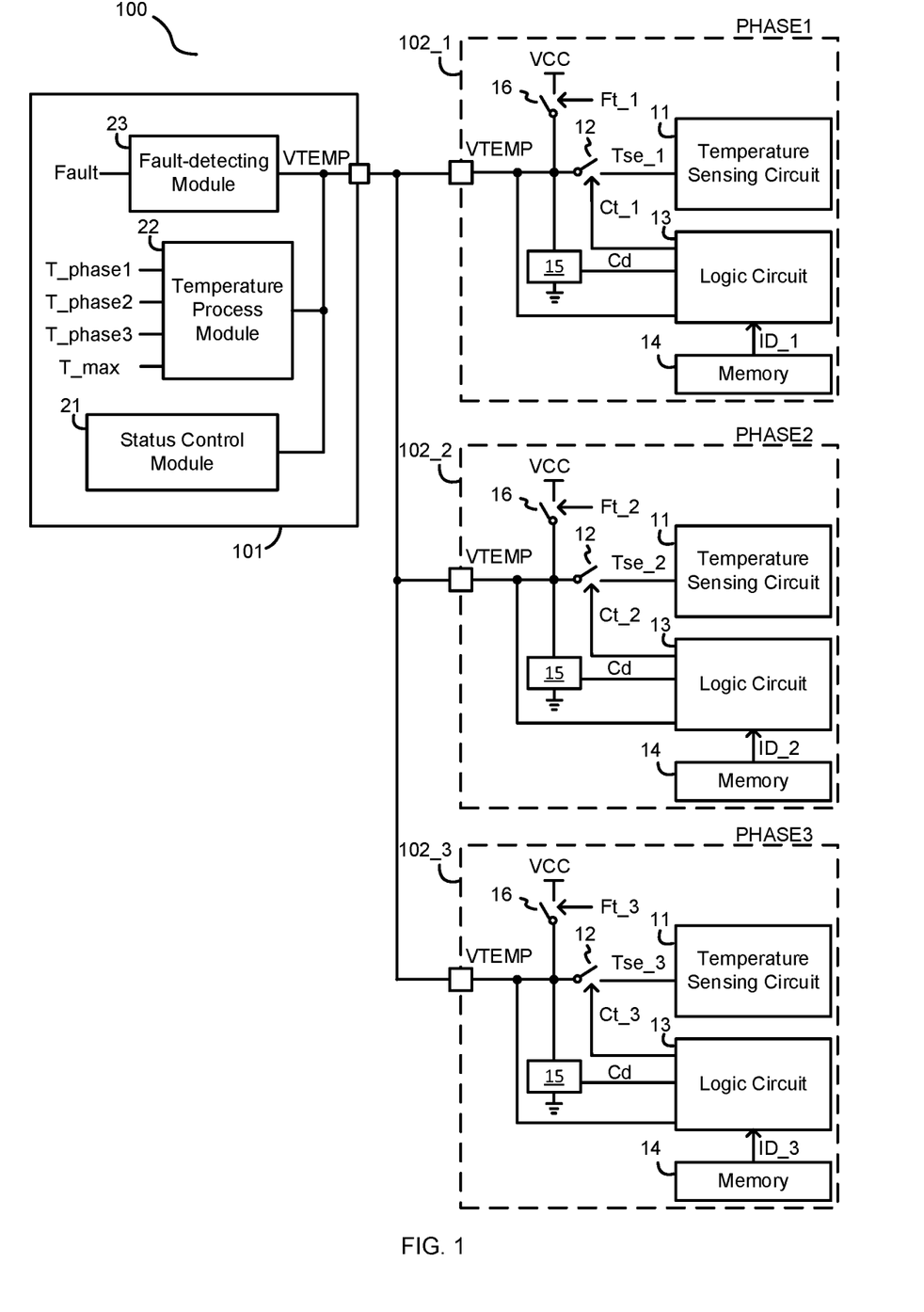
FIG. 1 schematically illustrates a multi-phase voltage converter diagram 100 in accordance with an embodiment of the present invention.

FIG. 1 schematically illustrates a multi-phase voltage converter diagram 100 in accordance with an embodiment of the present invention. In the example of FIG. 1, the multi-phase voltage converter 100 comprises three integrated circuits (ICs) 102 (i.e., 102-1, 102-2, and 102-3), and a controller 101. As can be appreciated, the multi-phase voltage converter 100 may also be implemented with less or more ICs 102. In one example, each IC 102 provides a phase of the multi-phase voltage converter.

As shown in FIG. 1, each IC 102 comprises a temperature report pin VTEMP, and the controller 101 comprises a temperature input pin VTEMP coupled to the temperature report pin VTEMP of each IC 102 to receive or provide a temperature monitoring signal VTEMP. Each IC 102 further comprises a temperature sensing circuit 11. The temperature sensing circuit 11 is configured to sense an individual temperature of a corresponding IC 102 and provide a temperature signal Tse_x representative of the individual temperature, x is 1, 2, or 3, e.g., provide a temperature signal Tse_1 for PHASE1, provide a temperature signal Tse_2 for PHASE2, and provide a temperature signal Tse_3 for PHASE3. In one embodiment, the controller 101 provides an acquiring command ACQ via the temperature input pin VTEMP to all of the ICs 102, and the acquiring command ACQ is capable of selecting one of the plurality of ICs to send the temperature signal Tse to the temperature input pin VTEMP. In one embodiment, the acquiring command ACQ is further capable of selecting all of the plurality of ICs to send the temperature signals Tse to the temperature input pin VTEMP. The temperature sensing circuit 11 of each IC 102 is configured to report or stop report the temperature signal Tse to the controller 101, i.e., provide the temperature signal Tse or stop providing the temperature signal Tse to the temperature input pin VTEMP in response to the acquiring command ACQ.

In one embodiment, each IC 102 has a sequencing code ID_x (e.g., ID_1 for 102_1, ID_2 for 102_2, and ID_3 for 102_3), the temperature sensing circuit 11 of each IC 102 is configured to be connected to the temperature report pin VTEMP to provide the temperature signal Tse_x or be disconnected from the temperature report pin VTEMP to stop providing the temperature signal Tse_x, in response to the acquiring command ACQ and the sequencing code ID_x. When the acquiring command ACQ matches with the sequencing code ID_x of the IC 102_x, the temperature sensing circuit 11 of the IC 102_x is configured to be connected to the temperature input pin VTEMP to send the temperature signal Tse_x, while the temperature sensing circuits 11 of remaining of the ICs 102 are configured to be disconnected from the temperature input pin VTEMP to stop sending the temperature signals Tse. In one embodiment, when the acquiring command ACQ matches with a predetermined code ID_all, the temperature sensing circuits 11 of all of the ICs 102 are configured to be connected to the temperature input pin VTEMP to provide a maximum temperature signal T_max representative of a maximum temperature among all of the ICs 102. The acquiring command ACQ, for example but not be limited to, may comprise a plurality of pulses, when a number of the pulses matches with the sequencing code ID_x of the IC 102_x, e.g., equals the sequencing code ID_x, the temperature sensing circuit 11 of the IC 102_x is configured to be connected to the temperature input pin VTEMP to send the temperature signal Tse_x. When the number of the pulses matches with the predetermined code ID_all, e.g., equals the predetermined code ID_all, the temperature sensing circuits 11 of all of the ICs 102 are configured to be connected to the temperature input pin VTEMP to provide the maximum temperature signal T_max. The sequencing code ID_x may be stored in a memory 14 of the IC 102_x, be programmed through controller 101 or be programmed by resistors.

As shown in FIG. 1, each IC 102 further comprises a switch 12 and a logic circuit 13. The switch 12 is configured to connect the temperature sensing circuit 11 to the temperature report pin VTEMP to provide the temperature signal Tse_x when the switch 12 is turned ON. The logic circuit 13 is coupled to the temperature report pin VTEMP, and is configured to provide a control signal Ct_x to control the switch 12 based on the acquiring command ACQ. In one embodiment, if the acquiring command ACQ matches with the sequencing code ID_x of the IC 102_x or the predetermined sequencing code ID_all, the switch 12 of the IC 102_x is turned on by the logic circuit 13 via the control signal Ct_x. One with ordinary skill in the art should understand that the switch 12 is just an example and could also be replaced by other suitable circuit which is capable of controlling whether the temperature signal Tse_x is reported.

As shown in FIG. 1, each IC 102 further comprises a pull down circuit 15 coupled between the monitoring pin VTEMP and a reference ground. The pull down circuit 15 may comprise a resistor, a current source, or a switch. In one embodiment, the logic circuit 12 provides the control signal Cd to control the pull down circuit 15. In one embodiment, each IC 102 further comprises a pull up switch 16. When there is any fault occurs, the pull up switch 16 is turned on by a fault indicating signal Ft_x, and the temperature report pin VTEMP is connected to a voltage source VCC through the pull up switch 16.

As shown in FIG. 1, the controller 101 further comprises a temperature process module 22. The temperature process module 22 is configured to send the acquiring command ACQ to the temperature input pin VTEMP, record the temperature monitoring signal VTEMP to register as the maximum temperature signal T_max, or one of the phase temperature signals T_phase 1, T_phase 2, and T_phase 3 representative of the individual temperature of the IC 102_1, 102_2, and 102_3 respectively, and provide the maximum temperature signal T_max, and phase temperature signals T_phase 1, T_phase 2, and T_phase 3.

As shown in FIG. 1, the controller 101 further comprises a status control module 21. The status control module 21 is configured to force the temperature input pin VTEMP to be at a first status or a second status. In one embodiment, just before sending the acquiring command ACQ, the temperature input pin VTEMP is forced to be at the first status by the status control module 21. The first status may comprise a high voltage level, maintaining at the high voltage level for a given time period (e.g., 10 us), or any other suitable status. In one embodiment, just after sending the acquiring command ACQ, the temperature input pin VTEMP is forced to be at the second status by the status control module 21. The second status may comprise a middle voltage level, or any other suitable status that is different from the first status.

In some examples, a voltage level between a high threshold voltage (e.g. 2V) and the voltage source VCC (e.g. 3.3V) is considered as the high voltage level, a voltage level between zero voltage (0 V) and a low threshold voltage (e.g.

1V) is considered as a low voltage level, and a voltage level between the high threshold voltage and low threshold voltage is considered as the middle voltage level.

In one example, the controller 101 further comprises a fault-detecting module 23. The fault-detecting module 23 is configured to check if there is any fault occurs on the ICs 102 based on a voltage at the temperature input pin VTEMP, for example, after the temperature input pin VTEMP is forced to be at the first status or the second status, and provide a fault-indicating signal Fault.

In the example of FIG. 1, the individual temperature of each IC 102 can be monitored separately, that is the controller 101 can read the individual temperature of each IC 102 respectively, without extra pin added. In this way, the controller 101 can perform dynamic thermal balance, individual healthy check, and other related functions easily.

Figure 2:
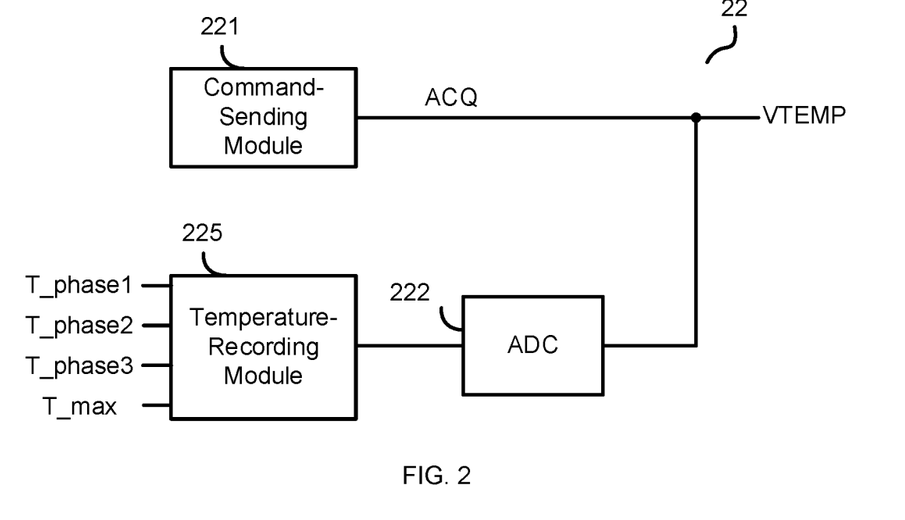
FIG. 2 schematically illustrates a temperature process module 22 in accordance with an embodiment of the present invention.

FIG. 2 schematically illustrates the temperature process module 22 in accordance with an embodiment of the present invention. One with ordinary skill in the art should understand that the temperature process module 22 is not limited by detailed structure of FIG. 2.

In the example of FIG. 2, the temperature process module 22 comprises a command-sending module 221, a temperature-recording module 225, and an analog-to-digital converter (ADC) 222. In one embodiment, the command-sending module 221 starts sending the acquiring command ACQ to the temperature input pin VTEMP just after the temperature input pin VTEMP is forced to be at the first status. In one embodiment, after the command-sending module 221 finishes sending the acquiring command ACQ, the ADC 222 samples the temperature monitoring signal VTEMP, and provides a digital signal to the temperature-recording module 225 via analog-to-digital conversion. The temperature-recording module 225 records the digital signal as the maximum temperature signal T_max, or one of the phase temperature signals T_phase 1, T_phase 2, and T_phase 3.

Figure 3:
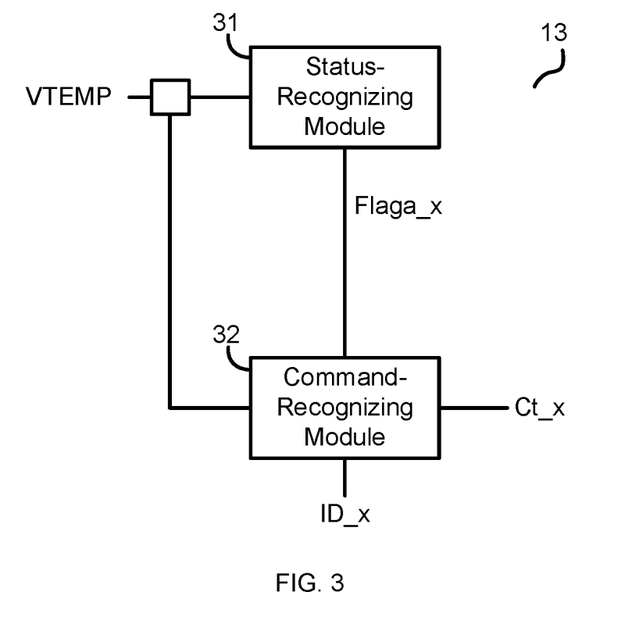
FIG. 3 schematically illustrates a logic circuit 13 in accordance with an embodiment of the present invention.

FIG. 3 schematically illustrates the logic circuit 13 in accordance with an embodiment of the present invention. One with ordinary skill in the art should understand that the logic circuit 13 is not limited by the detailed circuit structure of FIG. 3.

In the example of FIG. 3, the logic circuit 13 comprises a status-recognizing module 31, and a command-recognizing module 32. The status-recognizing module 31 identifies the first status and the second status of the temperature report VTEMP, and provides a flag signal Flaga_x accordingly. For example, when the temperature report pin VTEMP is forced to be at the first status, the flag signal Flaga_x becomes at the high voltage level. Until the temperature report pin VTEMP is forced to be at the second status, the flag signal Flaga_x becomes at the low voltage level. The command-recognizing module 32 is configured to identify the acquiring command ACQ during a time period from when the temperature report pin VTEMP is forced to be at the first status to when the temperature report pin VTEMP is forced to be at the second status (e.g., during a time period that the flag signal Flaga_x maintains at the high voltage level). The command-recognizing module 32 is further configured to determine if the temperature sensing circuit 11 is connected to or disconnected from the temperature report pin VTEMP (e.g., by providing the control signal Ct_x to control the switch 12), via comparing the acquiring command ACQ with the sequencing code ID_x.

Figure 4A:
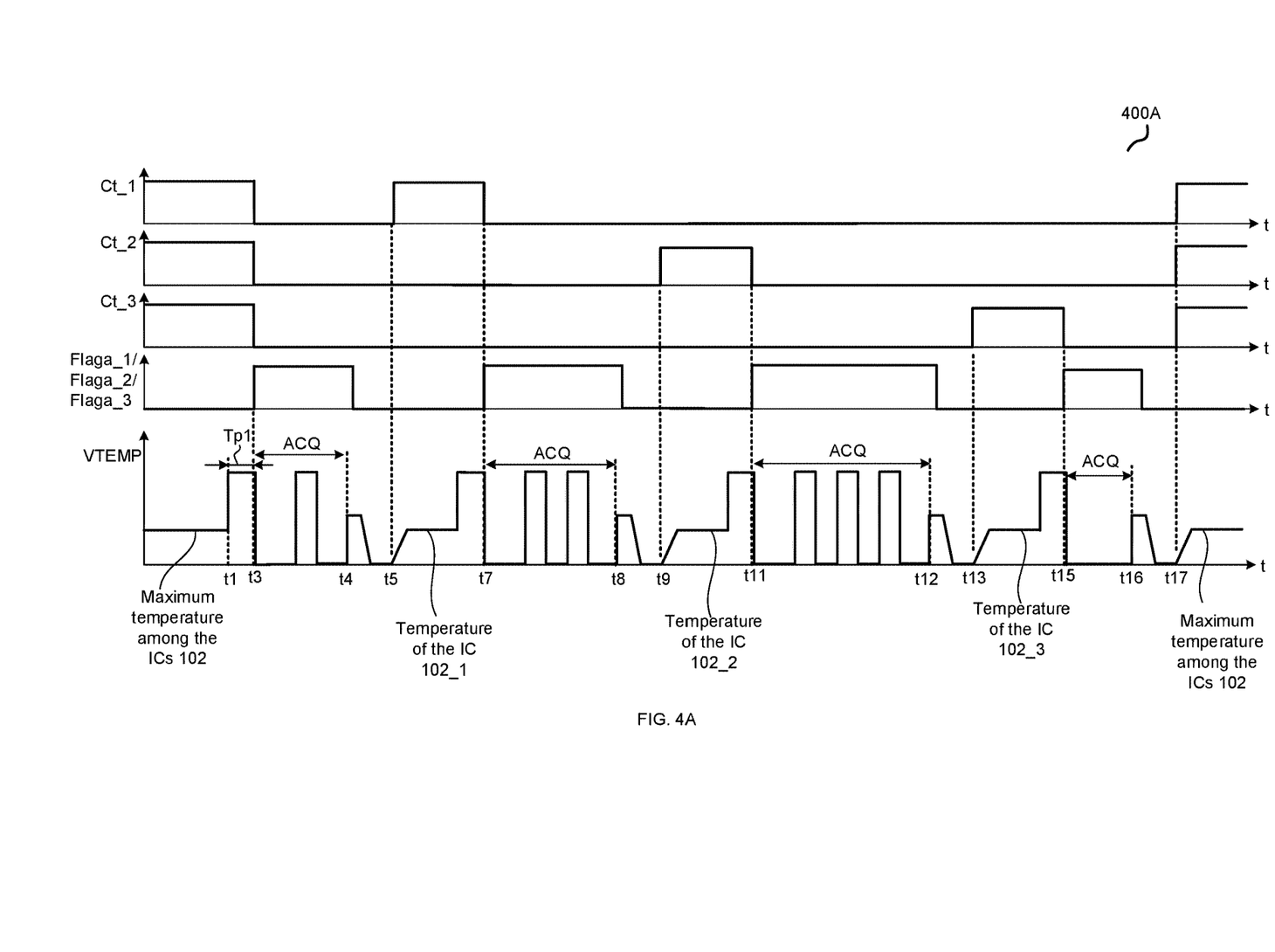
FIG. 4A shows a timing diagram 400A of the signals of the multi-phase voltage converter 100 in accordance with an embodiment of the present invention.

FIG. 4A shows a timing diagram 400A of the signals of the multi-phase voltage converter 100 in accordance with another embodiment of the present invention. FIG. 4A shows, from top to bottom, the control signal Ct_1, the control signal Ct_2, the control signal Ct_3, the flag signals Flaga_1, Flaga_2, and Flaga_3, and the voltage on the temperature input pin VTEMP.

In one example, after the multi-phase voltage converter 100 is enable, the temperature sensing circuit 11 of each IC 102 is connected to the temperature report pin VTEMP to provide the temperature signal Tse by default, and the voltage on the temperature input pin VTEMP represents the maximum temperature among all of the ICs 102. As shown in FIG. 4A, before time t1, the switch 12 of the IC 102_1 is turned ON by the control signal Ct_1, the switch 12 of the IC 102_2 is turned ON by the control signal Ct_2, and the switch 12 of the IC 102_3 is turned ON by the control signal Ct_3. At time t1, when the controller 101 needs to acquire an individual temperature of the IC 102_1, the controller 101 pulls up the temperature input pin VTEMP to be at the first status, e.g., at the high voltage level for longer than a time period Tp1. At time t3, the ICs 102 identify the first status of the temperature input pin VTEMP, the flag signals Flaga_1, Flaga_2, and Flaga_3 becomes to be at the high voltage level, and the control signals Ct_1, Ct_2, and Ct_3 becomes low to turn off the switch 12 of each of the ICs 102. The controller 101 starts sending the acquiring command ACQ. At time t4, the controller 101 finishes sending the acquiring command ACQ, and the controller 101 forces the temperature input pin VTEMP to be at the second status, e.g., be at the middle-voltage level. Just after time t4, the ICs 102 identify the second status of the temperature input pin VTEMP, then the flag signals Flaga_1, Flaga_2, and Flaga_3 becomes to be at the low voltage level. During time period t3-t4, the ICs 102 are configured to identify the acquiring command ACQ. After time t4, the controller 101 releases the temperature input pin VTEMP, and if there is no fault occurs, the temperature input pin VTEMP is pulled down by the pull down circuit 15.

In the example of FIG. 4A, the acquiring command ACQ comprises the plurality of pulses. Table 1 shows one example of the selected IC/ICs waiting to report the individual temperature based on the number of the pulses. One with ordinary skill in the art should be understand that other relationship between the number of the pulses and the selected IC may also be adopted.

TABLE 1

| Number of the pulses of the acquiring command ACQ | Selected IC/ICs waiting to report the individual temperature |
| --- | --- |
| 1 | IC 102_1 |
| 2 | IC 102_2 |
| 3 | IC 102_3 |
| 0 | All of the ICs 102 |

As shown in FIG. 4A, the acquiring command ACQ comprises one pulse during time period t3-t4, then at time t5, the control signal Ct_1 becomes high to turn on the switch 12 of the IC 102_1, and the IC 102_1 is selected to provide the temperature signal Tse1. Until at time t7, the temperature input pin VTEMP is pulled up for longer than the time period Tp1 again. The acquiring command ACQ comprises two pulses during time period t7-t8, then at time t9, the control signal Ct_2 becomes high to turn on the switch 12 of the IC 102_2, and the IC 102_2 is selected to provide the temperature signal Tse2. Until at time t11, the temperature input pin VTEMP is pulled up for longer than the time period Tp1 again. The acquiring command ACQ comprises three pulses during time period t11-t12, then at time t13, the control signal Ct_3 becomes high to turn on the switch 12 of the IC 102_3, and the IC 102_3 is selected to provide the temperature signal Tse3. Until at time t16, the temperature input pin VTEMP is pulled up for longer than a time period Tp1 again. In one example, if the acquiring command ACQ comprises a predetermined number of pulses (e.g., zero pulse as shown in FIG. 4A), during time period t15-t16, then at time t17, all of the control signals Ct_1, Ct_2, and Ct_3 become high to turn on all of the switch 12 of the ICs 102, and to provide the maximum temperature among the ICs 102.

Figure 4B:
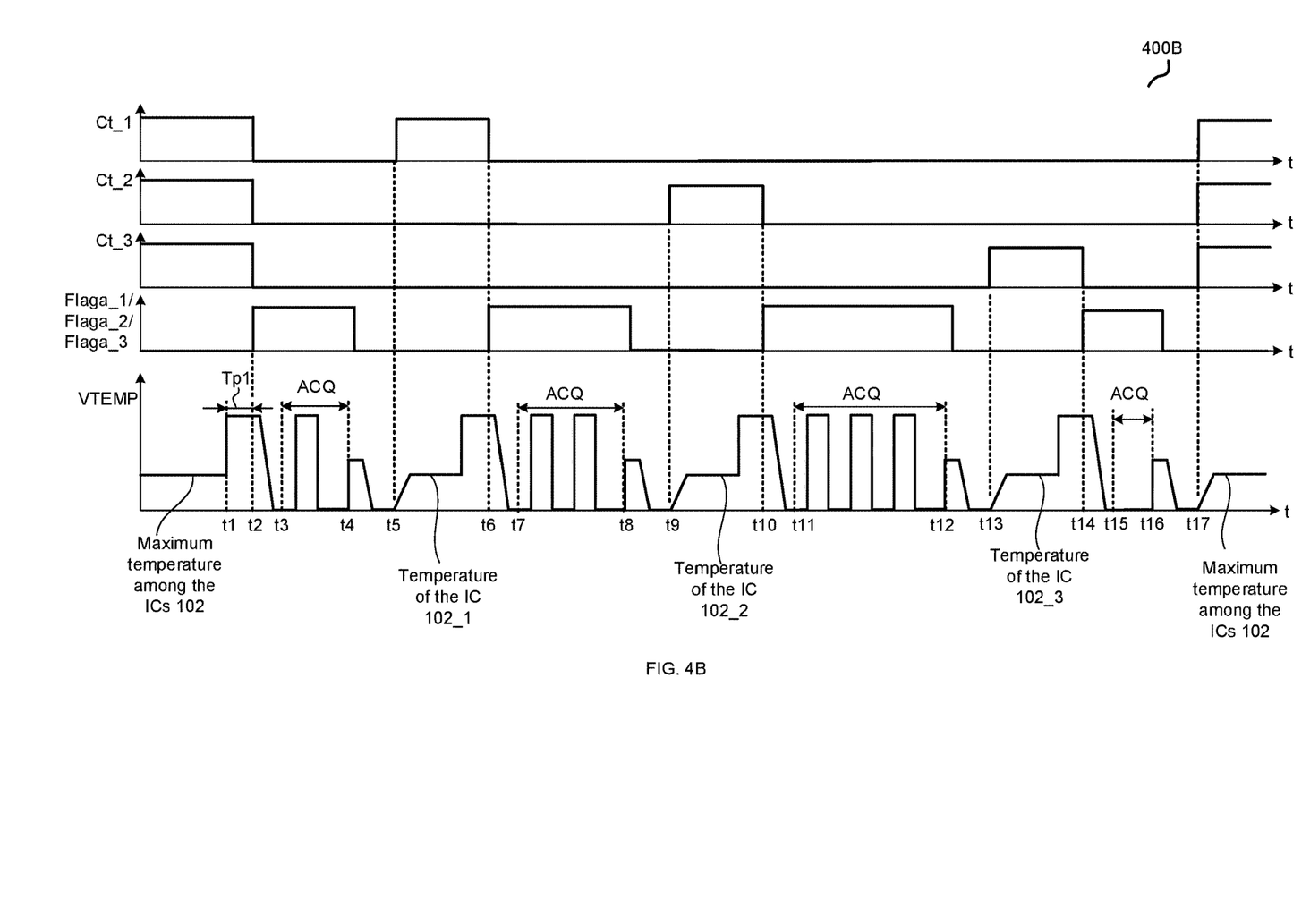
FIG. 4B shows a timing diagram 400B of the signals of the multi-phase voltage converter 100 in accordance with an embodiment of the present invention.

FIG. 4B shows a timing diagram 400B of the signals of the multi-phase voltage converter 100 in accordance with another embodiment of the present invention. FIG. 4B shows, from top to bottom, the control signal Ct_1, the control signal Ct_2, the control signal Ct_3, the flag signals Flaga_1, Flaga_2, and Flaga_3, and the voltage on the temperature input pin VTEMP.

In one example of FIG. 4B, after the temperature input pin VTEMP being pulled to be at the first status, then at time t2, the controller 101 releases the temperature input pin VTEMP. If there is no fault occurs on the ICs 102, then the temperature input pin VTEMP is pulled down by the pull down circuit 15. Then at time t3, the controller 101 starts sending the acquiring command ACQ.

Figure 5:
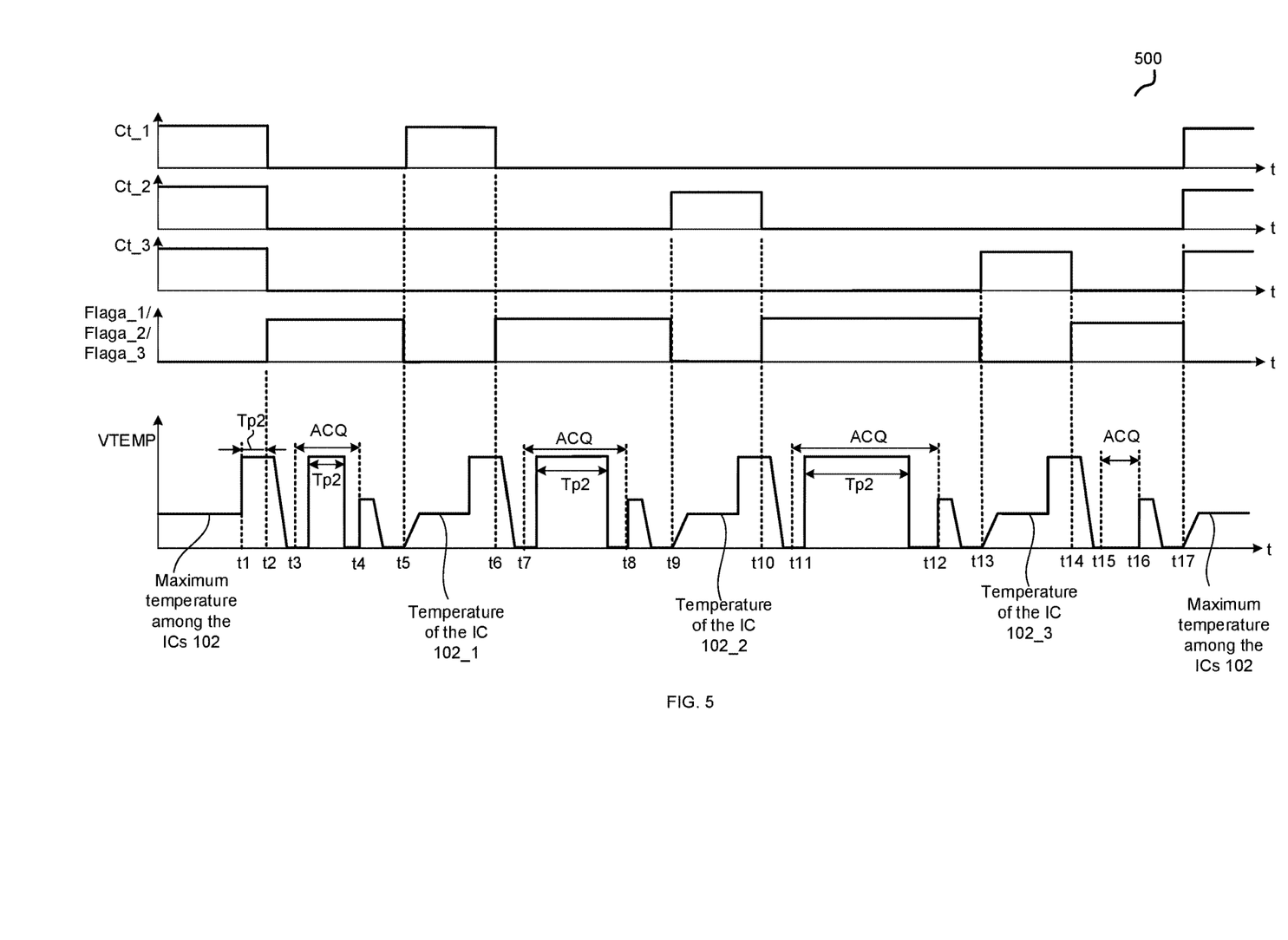
FIG. 5 shows a timing diagram 500 of the signals of the multi-phase voltage converter 100 in accordance with another embodiment of the present invention.

FIG. 5 shows a timing diagram 500 of the signals of the multi-phase voltage converter 100 in accordance with another embodiment of the present invention. FIG. 5 shows, from top to bottom, the control signal Ct_1, the control signal Ct_2, the control signal Ct_3, the flag signals Flaga_1, Flaga_2, and Flaga_3, and the voltage on the temperature input pin VTEMP.

In the example of FIG. 5, the acquiring command ACQ comprises a high voltage level signal with a time period Tp2. Table 2 shows the selected IC/ICs waiting to report the individual temperature based on the time period Tp2. Table 2 just shows one example, one with ordinary skill in the art should be understand that other relationship between the time period Tp2 and the selected IC may also be adopted.

TABLE 2

| The time period Tp2 | Selected IC/ICs waiting to report the individual temperature |
| --- | --- |
| 100 us | IC 102_1 |
| 200 us | IC 102_2 |
| 300 us | IC 102_3 |
| 0 us | All of the ICs 102 |

Figure 6:
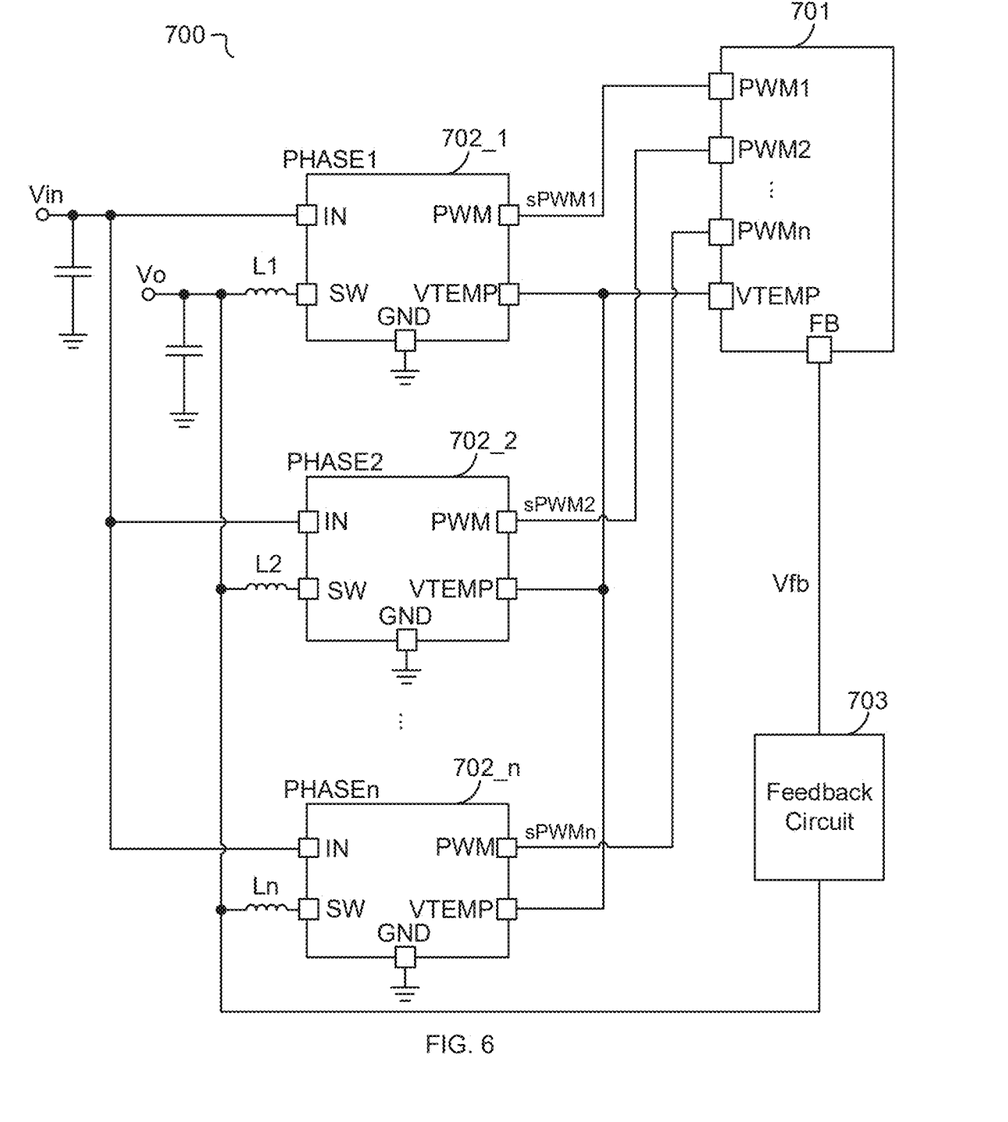
FIG. 6 schematically illustrates a multi-phase voltage converter diagram 700 in accordance with an embodiment of the present invention.

FIG. 6 schematically illustrates a multi-phase voltage converter 700 in accordance with an embodiment of the present invention. In the example of FIG. 6, the multi-phase voltage converter 700 comprises a plurality of ICs 702 (i.e., 702_1, 702_2 . . . 702_n), and a controller 701, where n is an integer larger than one.

In the example of FIG. 6, the plurality of ICs 702 are configured to form a multi-phase switching circuit, and each IC 702 provides a phase of the multi-phase converter 700. As show in FIG. 6, each IC 702 comprises a switching control pin PWM to receive a switching control signal sPWM, the temperature report pin VTEMP, a pin IN, a pin SW, and a pin GND. The pins IN of all of the ICs 702 are coupled together to receive the input voltage Vin, and the pin SW of each IC 702 is coupled to one terminal of an inductor Lx (i.e., L1, L2 . . . . Ln) respectively, and another terminal of the inductor Lx is coupled to rest of the inductors L1, L . . . Ln together to provide the output voltage Vo. The pin GND is coupled to the reference ground. In the example of FIG. 6, the controller 701 has a plurality of switching control pins PWM1-PWMn configured to provide a plurality of switching control signals sPWM1-sPWMn respectively, the temperature input pin VTEMP coupled to the temperature report pin VTEMP of each IC 702, and a feedback pin FB configured to receive the feedback signal Vfb. In one example, the multi-phase voltage converter 700 comprises a feedback circuit 703. The feedback circuit 703 is configured to provide the feedback signal Vfb based on the output voltage Vo.

Figure 7:
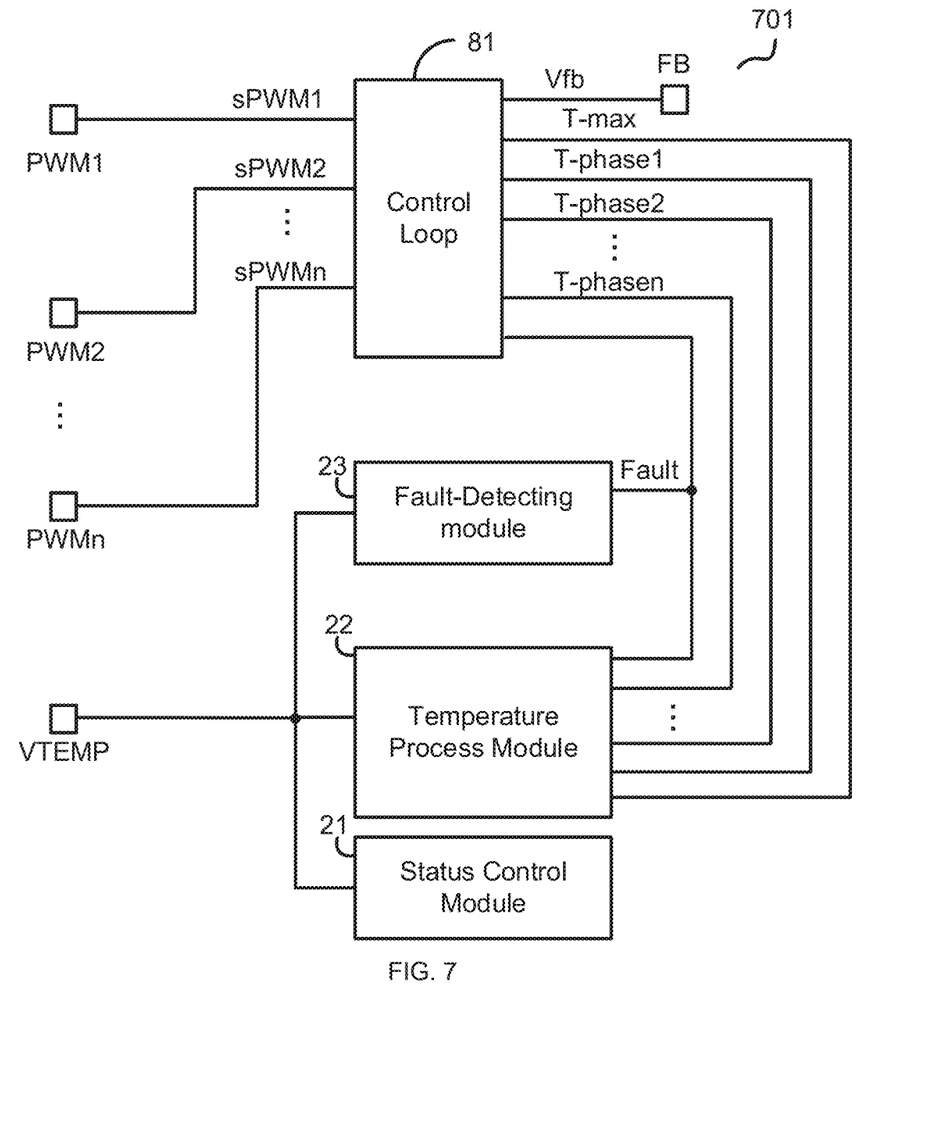
FIG. 7 schematically illustrates a controller 701 of the multi-phase voltage converter 700 shown in FIG. 6 in accordance with an embodiment of the present invention.

FIG. 7 schematically illustrates the controller 701 of the multi-phase voltage converter 700 shown in FIG. 6 in accordance with an embodiment of the present invention. FIG. 7 shows one example of the controller 701, one with ordinary skill in the art should understand that the detailed circuit structure of the controller 701 is not limited by the example shown in FIG. 7. In the example of FIG. 7, the controller 101 comprises the status control module 21, the temperature process module 22, and a control loop 81.

The control loop 81 is configured to receive the feedback signal Vfb representative of the output voltage Vo, the maximum temperature signal T-max, and the phase temperature signals T-phase 1, T-phase 2 . . . . T-phasen, and is configured to provide the switching control signals sPWM1-sPWMn based on the output voltage Vo, the maximum temperature signal Tmax, and the phase temperature signals T-phase 1, T-phase 2 . . . T-phase 3. In one example, the controller 101 further comprises the fault-detecting module 23 to provide the fault-indicating signal Fault, and the control loop 81 is further configured to provide the switching control signals sPWM1-n based on the fault-indicating signal Fault.

Figure 8:
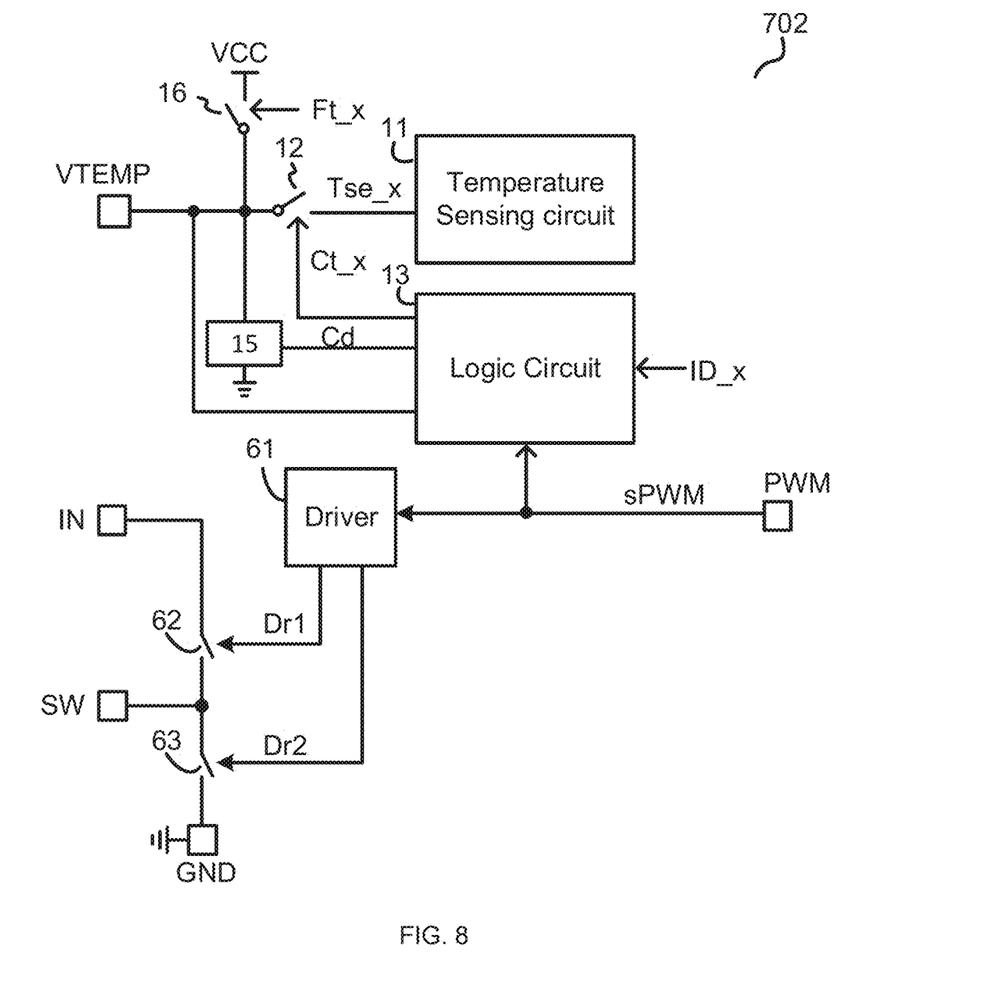
FIG. 8 schematically illustrates an IC 702 of the multi-phase voltage converter 700 shown in FIG. 6 in accordance with an embodiment of the present invention.

FIG. 8 schematically illustrates the IC 702 of the multi-phase voltage converter 700 shown in FIG. 6 in accordance with an embodiment of the present invention. FIG. 8 shows one example of the IC 702, one with ordinary skill in the art should understand that the detailed circuit structure of the IC 702 is not limited by the example shown in FIG. 8.

Compared with the IC 102, the IC 702 further comprises a driver 61, a high-side switch 62, and a low-side switch 63. The driver 61 is coupled to the switching control pin PWM to receive the switching control signal sPWM, and is configured to provide a drive signal Dr1 and a drive signal Dr2 based on the switching control signal sPWM. The high-side switch 62 has a first terminal coupled to the pin IN to receive the input voltage Vin, a second terminal coupled to the pin SW, and a control terminal coupled to the driver 61 to receive the drive signal Dr1. The high-side switch 62 is configured to be turned ON and OFF by the drive signal Dr1. The low-side switch 63 has a first terminal coupled to the second terminal of the high-side switch 62, a second terminal coupled to the pin GND, and a control terminal coupled to the driver 61 to receive the drive signal Dr2. The low-side switch 63 is configured to be turned ON and OFF by the drive signal Dr2. In one example, the high-side switch 62 and the low-side switch 63 are turned ON and OFF to convert the input voltage Vin to the output voltage Vo based on the switching control signal sPWM. In one example, the high-side switch 62 and the low-side switch 63 may be transistors, such as a MOSFET (Metal Oxide Semiconductor Field Effect Transistor), JFET (Junction Field Effect Transistor), VFET (Vertical Channel Field Effect Transistor) and so on.

Figure 9:
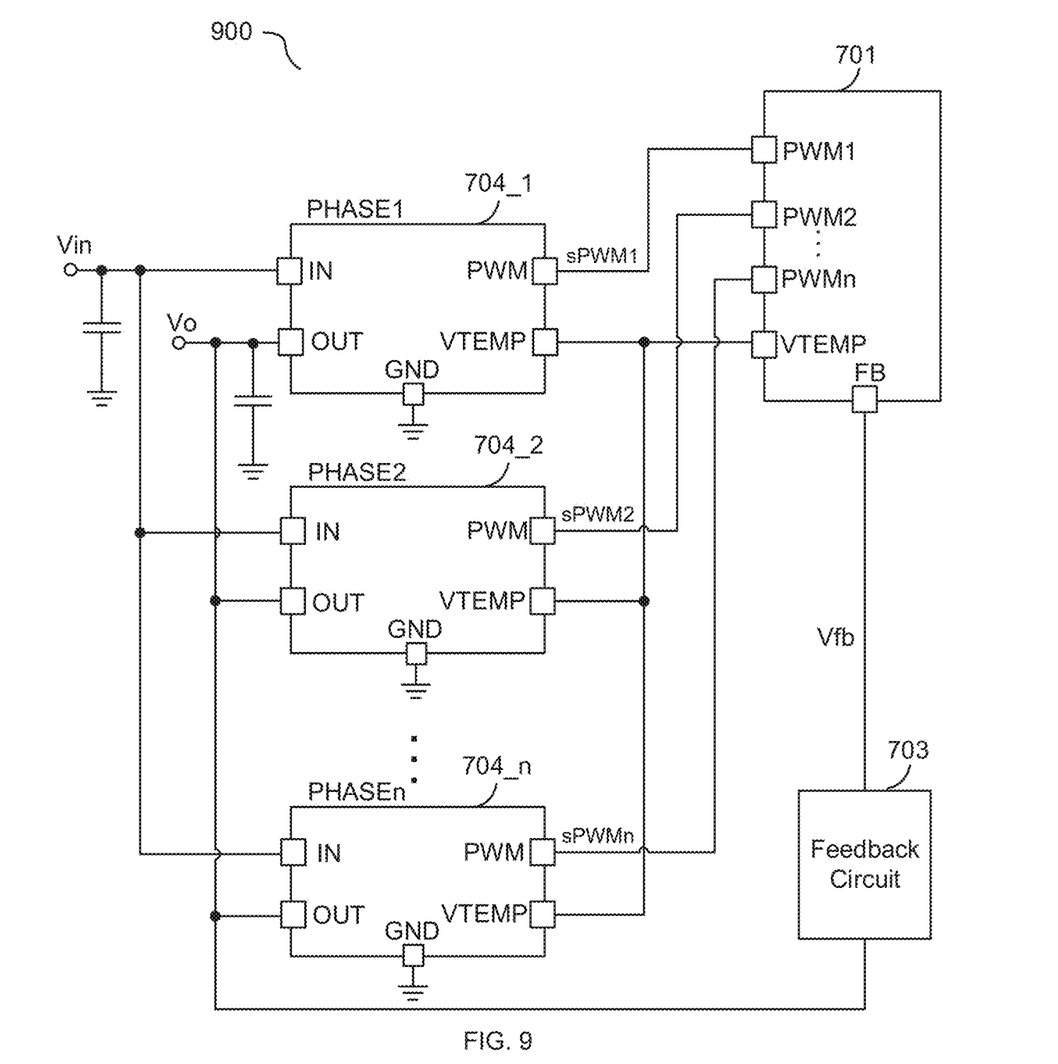
FIG. 9 schematically illustrates a multi-phase voltage converter diagram 900 in accordance with another embodiment of the present invention.

FIG. 9 schematically illustrates a multi-phase voltage converter 900 in accordance with an embodiment of the present invention. In the example of FIG. 9, the multi-phase voltage converter 900 comprises a plurality of ICs 704 (i.e., 704_1, 704_2 . . . 704_n), and a controller 701, where n is an integer larger than one. In the example of FIG. 9, the plurality of ICs 704 are configured to form a multi-phase switching circuit, and each IC 704 provides a phase of the multi-phase converter 900. As show in FIG. 9, each IC 704 comprises the switching control pin PWM to receive the switching control signal sPWM, the temperature report pin VTEMP, the pin IN, a pin OUT, and the pin GND. The pin IN of all of the ICs 704 are coupled together to receive the input voltage Vin, and the pin OUT of all of the ICs 704 are coupled together to provide the output voltage Vo. The pin GND is coupled to the reference ground.

Figure 10:
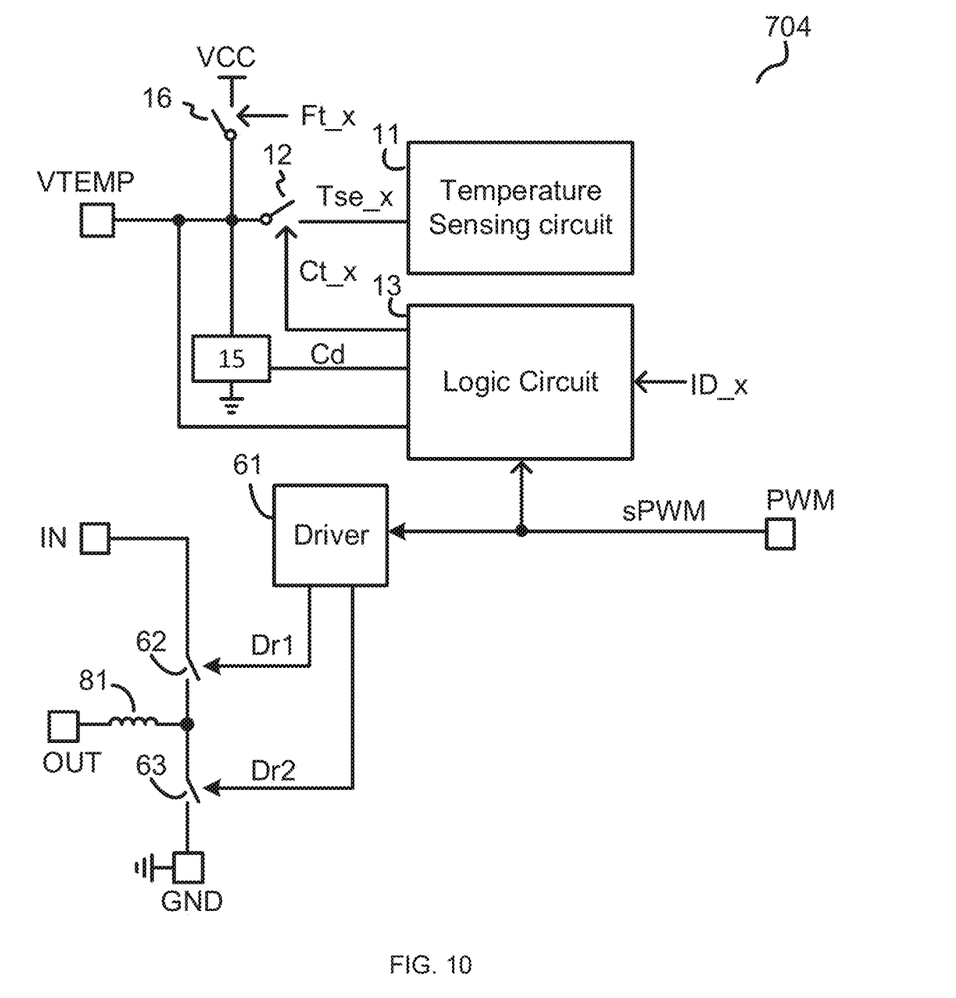
FIG. 10 schematically illustrates an IC 704 of the multi-phase voltage converter 900 shown in FIG. 9 in accordance with an embodiment of the present invention.

FIG. 10 schematically illustrates the IC 704 of the multi-phase voltage converter 900 shown in FIG. 9 in accordance with an embodiment of the present invention. FIG. 10 shows one example of the IC 704, one with ordinary skill in the art should understand that the detailed circuit structure of the IC 704 is not limited by the example shown in FIG. 10.

Compared with the IC 702, the IC 704 further comprises an inductor 81. The first terminal of the high-side switch 62 is coupled to the pin IN to receive the input voltage Vin, the second terminal of the high-side switch 62 is coupled to one terminal of the inductor 81, and a control terminal of the high-side switch is coupled to the driver 61 to receive the drive signal Dr1. Another terminal of the inductor 81 is coupled to the pin OUT. The first terminal of the low-side switch 63 is coupled to the second terminal of the high-side switch 62, the second terminal of the low-side switch 63 is coupled to the pin GND, and the control terminal of the low-side switch 63 is coupled to the driver 61 to receive the drive signal Dr2.

Figure 11:
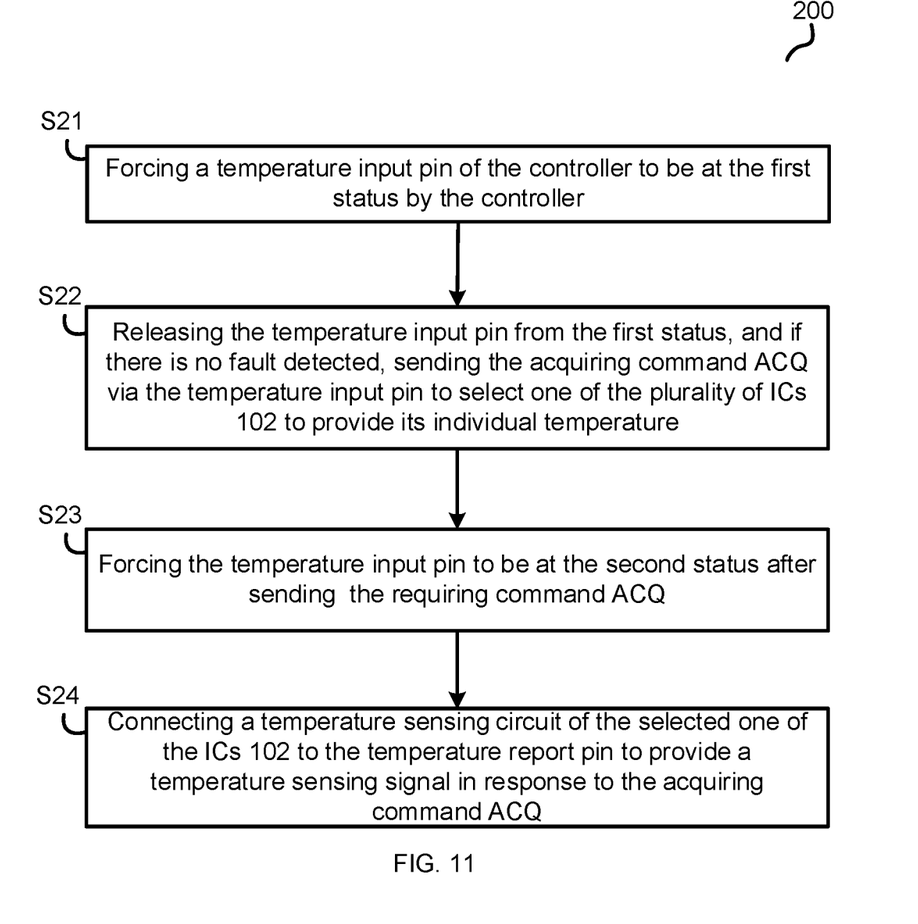
FIG. 11 illustrates a method 200 for an individual temperature reporting of a multi-phase converter in accordance with an embodiment of the present invention.

FIG. 11 illustrates a method 200 for an individual temperature reporting of the multi-phase converter in accordance with an embodiment of the present invention. The multi-phase converter comprises a controller and a plurality of ICs, each of the plurality of ICs provides a phase of the multi-phase voltage converter. The method 200 has steps S21-S24.

At the step S21, forcing a temperature input pin of the controller to be at the first status by the controller. Each of the plurality of ICs comprises a temperature report pin coupled to the temperature input pin.

At the step S22, releasing the temperature input pin from the first status, and if there is no fault detected, sending the acquiring command ACQ via the temperature input pin by the controller to select one of the plurality of ICs to provide its individual temperature.

At the step S23, forcing the temperature input pin to be at the second status by the controller after sending the requiring command ACQ.

At the step S24, connecting a temperature sensing circuit of the selected one of the ICs 102 to the temperature report pin to provide a temperature sensing signal representative of the individual temperature of the selected one of the ICs 102 in response to the acquiring command ACQ.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. A multi-phase voltage converter, comprising:
a plurality of integrated circuits (ICs) that each provides a phase of the multi-phase voltage converter, each of the plurality of ICs comprising a temperature report pin, and a temperature sensing circuit that is configured to sense an individual temperature of an IC containing the temperature sensing circuit, and the temperature report pin is configured to receive an acquiring command, and if the IC is specifically selected in response to the acquiring command, the temperature report pin is configured to report the individual temperature; and
a controller, comprising a temperature input pin, the temperature input pin is coupled to the temperature report pin of each of the plurality of ICs, the controller is configured to provide the acquiring command via the temperature input pin to all of the plurality of ICs to select a specific one of the plurality of ICs to report the individual temperature via the temperature input pin; wherein
the acquiring command is configured to select one of the plurality of ICs to report the individual temperature;
the controller is configured to force the temperature input pin to be at a first status before providing the acquiring command, and the controller is configured to force the temperature input pin to be at a second status for a time period after providing the acquiring command; and wherein
after the time period, the controller is configured to release control of the temperature input pin and record an information received from the temperature input pin.

2. The multi-phase voltage converter of claim 1, wherein the acquiring command is further configured to select all of the plurality of ICs to report the individual temperature.

3. The multi-phase voltage converter of claim 1, wherein when the acquiring command matches with a sequencing code of a corresponding one of the plurality of ICs, the corresponding one of the plurality of ICs is configured to report the individual temperature, while other of the plurality of ICs are configured to stop reporting the individual temperature.

4. The multi-phase voltage converter of claim 3, wherein the sequencing code is stored in a memory.

5. The multi-phase voltage converter of claim 1, wherein the acquiring command comprises a plurality of pulses.

6. The multi-phase voltage converter of claim 1, wherein when the acquiring command matches with a predetermined code, each of the plurality of ICs is configured to report the individual temperature.

7. An integrated circuit (IC) providing a phase of a multi-phase voltage converter, the IC comprising:
a power supply pin, configured to receive an input voltage;
a power switch, configured to be turned ON and OFF to convert the input voltage to an output voltage; and
a temperature report pin, coupled to a plurality of ICs that are connected together, the temperature report pin is configured to receive an acquiring command to select a specific IC to report an individual temperature and reporting the individual temperature if the IC is specifically selected in response to the acquiring command; wherein the IC has a sequencing code, and the temperature report pin is configured to report and stop reporting the individual temperature in response to the acquiring command and the sequencing code;

the temperature report pin is forced to be at a first status before receiving the acquiring command, and the temperature report pin is forced to be at a second status for a time period after receiving the acquiring command; and wherein after the time period, the temperature report pin is released from the second status, and the temperature report pin is configured to provide an information which will be recorded by a controller.

8. The IC of claim 7, wherein when the acquiring command matches with the sequencing code or a predetermined code, the temperature report pin is configured to report the individual temperature.

9. The IC of claim 8, wherein when the acquiring command mismatches with both the sequencing code and the predetermined code, the temperature report pin is configured to stop reporting the individual temperature.

10. The IC of claim 7, wherein the acquiring command comprises a plurality of pulses.

11. The IC of claim 7, wherein the IC is further configured to identify the acquiring command, and determine if the temperature report pin is configured to report the individual temperature based on the acquiring command.

12. The IC of claim 7, wherein the sequencing code is stored in a memory.

13. A controller for a multi-phase voltage converter, comprising:
　　a temperature input pin, coupled to a plurality of integrated circuits (IC) to provide an acquiring command to select a specific one of the plurality of ICs to report an individual temperature and receive a temperature monitoring signal representative of the individual temperature of the specifically selected one of the plurality of ICs, each of the plurality of ICs provides a phase of the multi-phase voltage converter; and
　　a plurality of switching control pins, configured to provide a plurality of switching control signals to control the plurality of ICs respectively; wherein
　　the acquiring command is configured to select one of the plurality of ICs to provide the temperature monitoring signal representative of the individual temperature of the one of the plurality of ICs;
　　the controller is configured to force the temperature input pin to be at a first status before providing the acquiring command, and the controller is further configured to force the temperature input pin to be at a second status for a time period after providing the acquiring command; and wherein
　　after the time period, the controller is configured to release control of the temperature input pin and record an information received from the temperature input pin.

14. The controller of claim 13, wherein the acquiring command is further configured to select all of the plurality of ICs to provide the temperature monitoring signal representative of a maximum temperature among all of the plurality of ICs.

15. The controller of claim 13, wherein the acquiring command comprises a plurality of pulses.

16. The controller of claim 13, wherein the controller is configured to record a maximum temperature among the plurality of ICs, and a plurality of individual temperatures of the plurality of ICs based on the temperature monitoring signal.

* * * * *